United States Patent [19]

Shimoguri

[11] Patent Number: 5,285,809
[45] Date of Patent: Feb. 15, 1994

[54] DRAIN DISCHARGE DEVICE

[75] Inventor: Yoshiyuki Shimoguri, Yokohama, Japan

[73] Assignee: Fukuhara Corporation, Yokohama, Japan

[21] Appl. No.: 856,657

[22] Filed: Mar. 24, 1992

[30] Foreign Application Priority Data

Oct. 11, 1991 [JP] Japan .................. 3-091522[U]

[51] Int. Cl.⁵ .............................................. F16K 5/06
[52] U.S. Cl. ................... 137/203; 137/624.18; 137/625.41
[58] Field of Search ............... 137/625.11, 625.47, 137/624.18, 203, 204, 625.41

[56] References Cited

U.S. PATENT DOCUMENTS

| | | | |
|---|---|---|---|
| 97,366 | 11/1869 | Dodge | 137/625.41 |
| 2,806,486 | 9/1957 | McDonald | 137/625.11 X |
| 3,050,082 | 8/1962 | Bass | 137/625.11 |
| 3,079,941 | 3/1963 | Cruise | 137/625.11 X |
| 3,118,650 | 1/1964 | Cooper | 137/625.41 X |
| 3,678,959 | 7/1972 | Liposky | 137/625.4 X |
| 4,396,036 | 8/1983 | Horikawa | 137/625.41 X |
| 4,441,524 | 4/1984 | Mese | 137/625.47 |
| 4,572,239 | 2/1986 | Koch | 137/625.47 |
| 5,046,522 | 9/1991 | Devehat | 137/625.11 X |

Primary Examiner—Robert G. Nilson
Attorney, Agent, or Firm—Thomas R. Morrison

[57] ABSTRACT

A drain discharge device for discharging effluent comprises a valve with a single outlet and a plurality of inlets that selectively connects the single outlet to one of inlets in turn. The inlets, each of which corresponds to an outlet of an effluent discharging device, such as an air compressor or an after cooler, are each sequentially connected to the single outlet in order to drain effluent. Due to the sequential connection of the drain points to the outlet, the drain discharge device operates irrespective of air pressure differences at the drain points. In addition, since each drain point is connected to the outlet in sequence, the system avoids clogging by particulate foreign substances or lubricants. One embodiment discloses a device having a single valve serving three or more inlets. Embodiments employing a rotary ball valve and a linearly moving valve are both disclosed. In one ball valve embodiment, inlets and outlet are in the same plane. In a further ball valve embodiment, the inlets are all in one plane, and an axis of the outlet is orthogonal to this plane, and rotation of the ball valve is about the axis of the outlet.

6 Claims, 8 Drawing Sheets

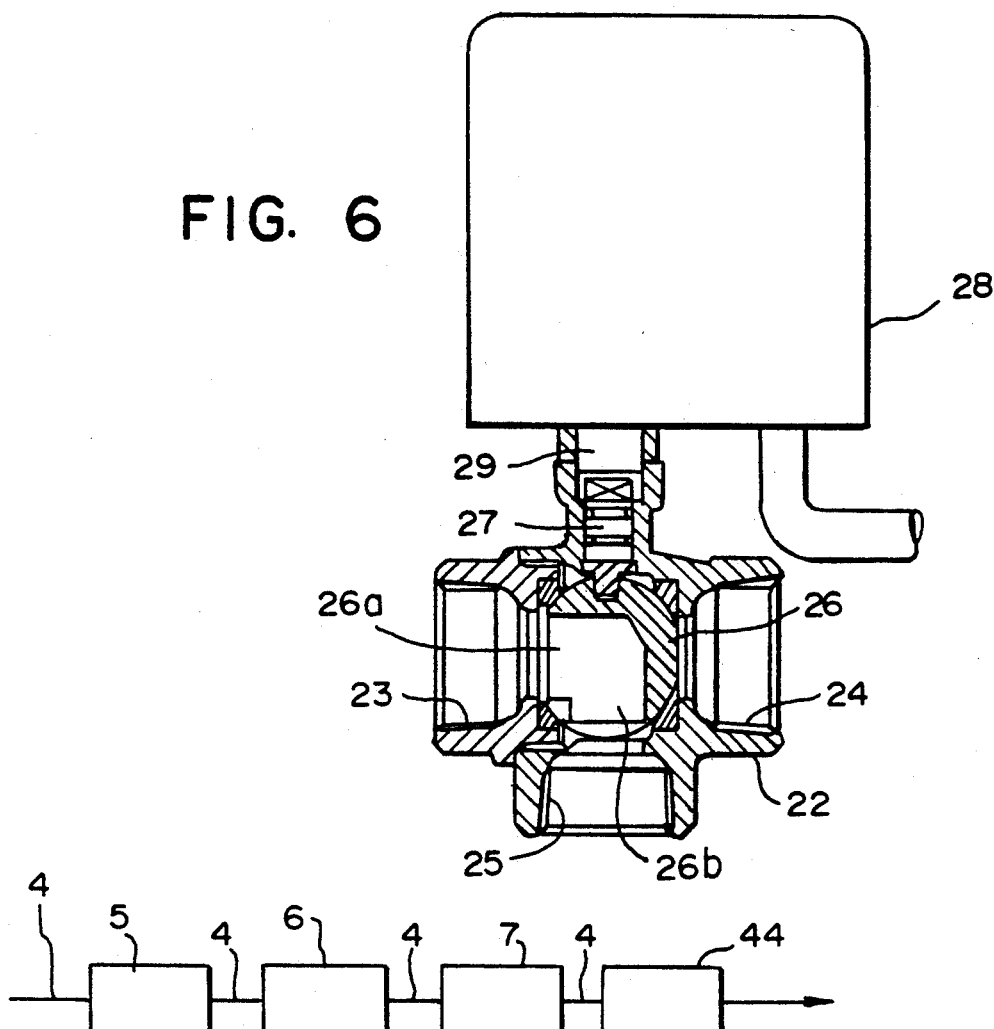
FIG. 6
FIG. 8
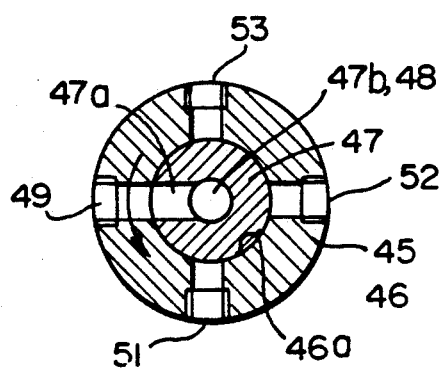
FIG. 9

DRAIN DISCHARGE DEVICE

BACKGROUND OF THE INVENTION

The present invention relates to a water ejector for discharging condensate from such devices as an air tank of an air compressor, an after cooler, a drain separator, an air drier, or a mist separator.

In a conventional air compressor, moisture condensed from the compressed air is normally contaminated with oil and particulates, so it must be kept from entering downstream devices lest they also become contaminated. It is customary to pass the compressed air through drying devices, such as an after cooler, a drain separator, and an air drier, connected in series to remove the moisture, oil, and other contaminants. In some cases, a mist separator may also be included.

Drain discharge valves, which control the flow of liquid from drain pipes, may be any suitable devices, whether mechanical, electromagnetic, or electric (shutter/opening and closing). Automatic operation of drain discharge valves using, for example, electromagnetic valves, is desirable. However, the cost of four electromagnetic valves, one for each device, is quite high. In a conventional system, a single drain discharge valve cannot be substituted for a sequence of such valves because the series connection of the devices induces pressure drops in the downstream direction, whereby air pressure at each drain discharge valve decreases with each valve in the sequence.

In another prior-art embodiment of a drain discharge device, drain discharge outlets are coupled in sequence according to decreasing discharge pressure. Compressed air is fed through a feed pipe to an after cooler, which is at a pressure relatively higher than the air pressure of a drain separator, both of which are coupled to an inlet of a drain discharge valve. A check valve between the drain separator and the drain discharge valve prevents drain discharge effluent from flowing back from the drain discharge valve side to the drain separator side. This drain discharge embodiment reduces system cost by the difference between the price of a drain discharge valve (which is expensive) and the price of a check valve.

The saving is effected through the removal of one of the drain discharge valves in the conventional example described above. However, the check valve may become clogged with particulate foreign matter and thereby lose its ability to function. As a result, drain discharge outlets of the after cooler and the drain separator are effectively coupled together and the discharge of effluent from the drain separator becomes difficult. Further, when the drain discharge valve is open, if the difference in the air pressure between the drain outlet of the after cooler and the drain outlet of the drain separator is small, the viscosity of oil in the drain keeps the check valve from opening despite its inherent preset pressure. Consequently, no effluent can be discharged. Although the number of drain discharge valves can be reduced by adding a plurality of check valves, the greater the number of check valves, the more likely the clogging.

OBJECTS AND SUMMARY OF THE INVENTION

It is an object of the present invention to provide a drain discharge device that overcomes the drawbacks of the prior art.

It is a further object of the present invention to provide a drain discharge device that freely discharges drain effluent from a plurality of connected devices.

It is still a further object of the present invention to provide a drain discharge device whose drain discharge valve consists of an electric ball valve.

Briefly stated, the present invention provides a drain discharge device for discharging effluent which includes a valve with a single outlet and a plurality of inlets that selectively connects the single outlet to one of inlets in turn. The inlets, each of which corresponds to an outlet of an effluent discharging device, such as an air compressor or an after cooler, are each sequentially connected to the single outlet in order to drain effluent. Due to the sequential connection of the drain points to the outlet, the drain discharge device operates irrespective of air pressure differences at the drain points. In addition, since each drain point is connected to the outlet in sequence, the system avoids clogging by particulate foreign substances or lubricants. One embodiment discloses a device having a single valve serving three or more inlets. Embodiments employing a rotary ball valve and a linearly moving valve are both disclosed. In one ball valve embodiment, inlets and outlet are in the same plane. In a further ball valve embodiment, the inlets are all in one plane, and an axis of the outlet is orthogonal to this plane, and rotation of the ball valve is about the axis of the outlet.

According to an embodiment of the invention, there is provided a device for draining effluent comprising: a valve having an outlet and a plurality of inlets, means for connecting at least two of the plurality of inlet to respective drain outlets of at least two source devices that discharge effluent, and means for sequentially connecting the outlet to each of the plurality of inlets.

According to a feature of the invention, there is provided a method for draining condensate from at least first and second points in a compressed air system, the first and second points being at different pressures comprising: connecting a drainage outlet of the first point to an inlet of a valve, passing the condensate through the valve to an outlet thereof, disconnecting the valve from the first point, connecting a drainage outlet of the second point to the inlet, passing the condensate through the valve to the outlet, disconnecting the valve from the second point, and means for automatically controlling the steps of connecting and disconnecting, whereby the first and second points are drained of condensate according to a predetermined sequence.

One example of a system requiring the device of the present invention is an after cooler through which travels air blown from an air tank that stores air compressed by an air compressor. A drain separator is connected to the after cooler, which is in turn connected to an air drier. By employing the apparatus of the present invention in the above-described system, each component thereof may be drained of effluent in sequence using only a single drain discharge valve.

The above, and other objects, features and advantages of the present invention will become apparent from the following description read in conjunction with

BRIEF DESCRIPTION OF THE DRAWINGS

FIG. 6 is a vertical sectional view of another embodiment of the present invention.

FIG. 8 is a schematic diagram of still another embodiment of the present invention.

FIG. 9 is a cross sectional view of the drain discharge valve of the embodiment shown in FIG. 8.

DETAILED DESCRIPTION OF THE PREFERRED EMBODIMENTS

Figure 12:
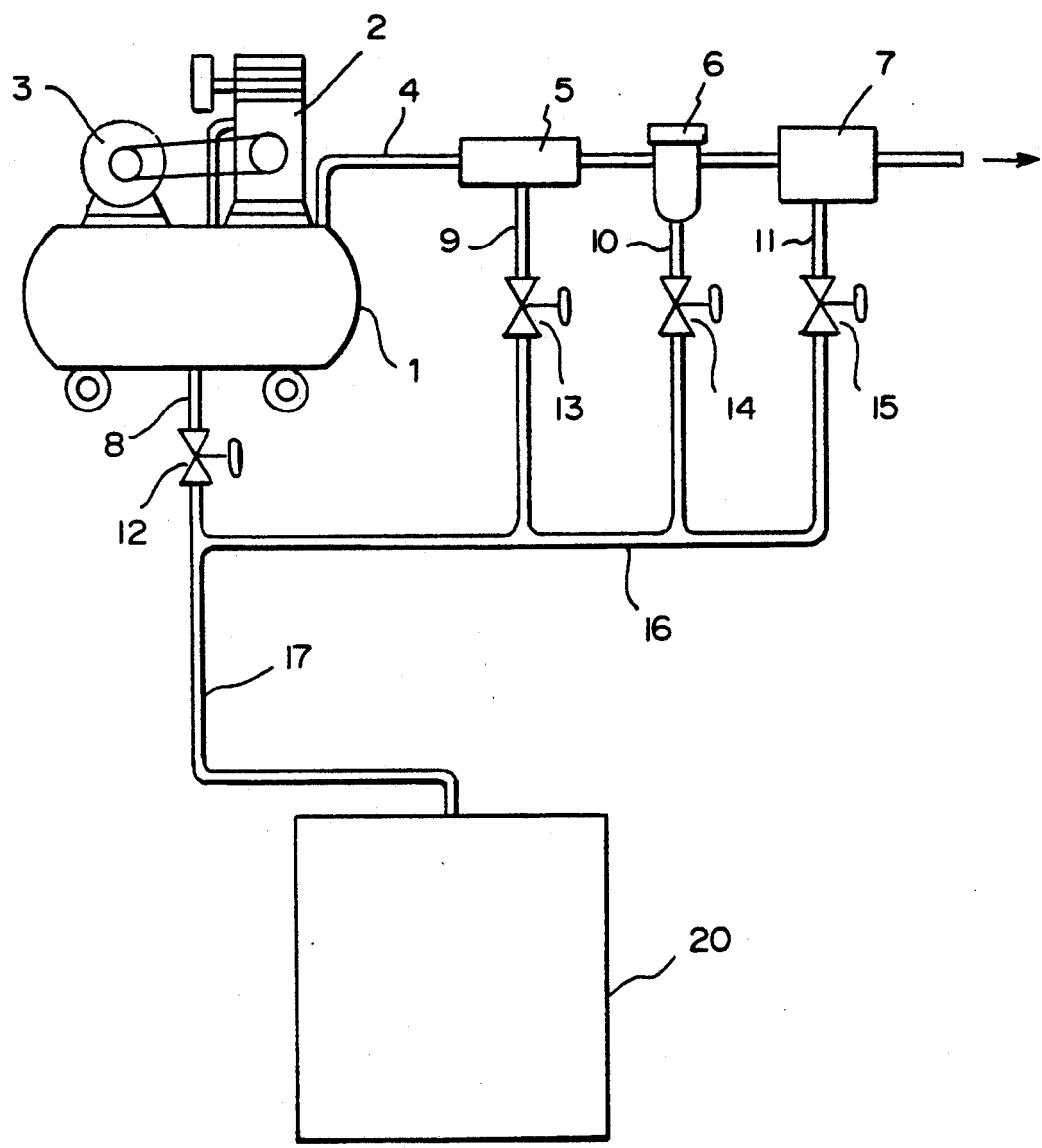
FIG. 12 is a flow diagram that shows an example of the prior art.

Referring to FIG. 12, a conventional air compressor includes a motor 3 and an air compressor 2 mounted on an air tank 1. A belt drive, or other device, applies torque from motor 3 to air compressor 2. An outlet (not shown) of air compressor 2 feeds compressed air into air tank 1. A compressed-air pipe 4 feeds the compressed air from air tank 1 to devices that consume compressed air.

Moisture condensed from the compressed air is normally contaminated with oil and particulates, so it must be prevented from entering downstream devices. It is customary to pass the compressed air through drying devices, for example, an after cooler 5, a drain separator 6, and an air drier 7, connected in series with the outlet of compressed air pipe 4, to remove the moisture, oil, and other contaminants. In some cases, a mist separator may also be included.

Drain pipes 8, 9, 10, and 11 permit moisture to drain from the bottoms of air tank 1, after cooler 5, drain separator 6, and air drier 7 respectively through a drain pipe 16 and a drain manifold 17 to a moisture disposal device 20, for example, a tank or a drain. Discharge valves 12, 13, 14, and 15 control the flow of liquid from drain pipes 8, 9, 10, and 11 respectively. Discharge valves 12, 13, 14, and 15 may be any suitable devices, whether mechanical, electromagnetic, or electric (shutter/opening and closing).

Automatic operation of drain discharge valves 12-15 using, for example, electromagnetic valves, is desirable. However, the cost of four electromagnetic valves is quite high. Drain pipes 8, 9, 10 and 11 cannot be connected together for discharging moisture through a single discharge valve because the air pressure of each drain discharge valve differs from that of the others, inasmuch as the discharge pressure decreases with each valve in the sequence.

Figure 13:
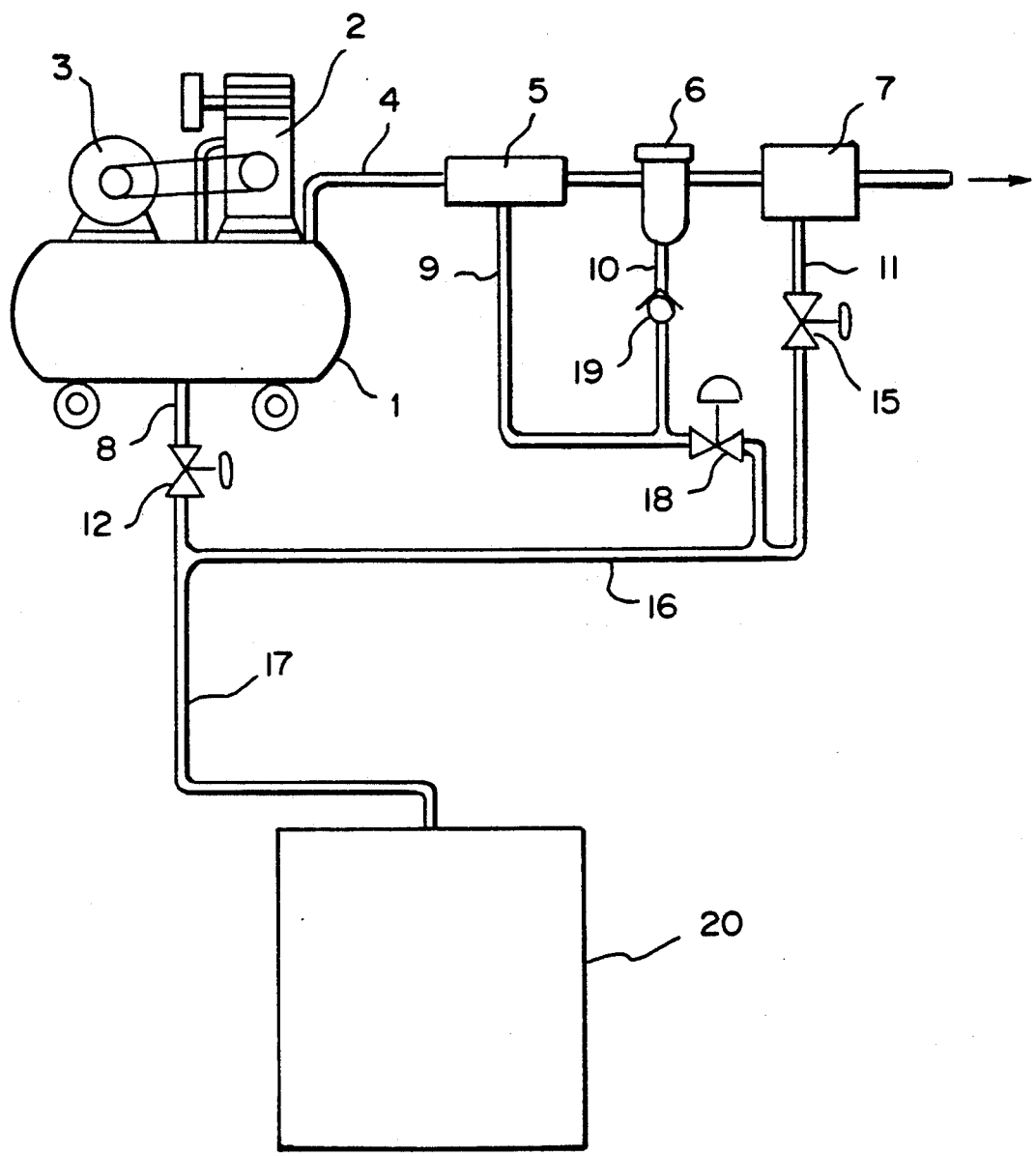
FIG. 13 is a flow diagram that shows a further example of the prior art.

FIG. 13 is another prior-art embodiment of a drain discharge device which couples drain discharge outlets in sequence in order of decreasing discharge pressure at the outlets of the devices they serves. Compressed air is fed through compressed-air pipe 4 to after cooler 5, which is at a pressure relatively higher than the air pressure of drain separator 6. Both after cooler 5 and drain separator 6 are joined by pipes to an inlet of a drain discharge valve 18. A check valve 19 between drain separator 6 and drain discharge valve 18 prevents effluent from flowing back from the drain discharge valve 18 side to the drain separator 6 side.

The drain discharge system of FIG. 13 reduces system cost by the difference between the price of a drain discharge valve (which is expensive) and the price of a check valve (which is inexpensive). This saving is effected through the removal of one of the drain discharge valves shown in the example of FIG. 12.

However, check valve 19 in the system of FIG. 13 may become clogged with particulate foreign matter and thereby lose its function. As a result, drain discharge outlets of after cooler 5 and drain separator 6 are effectively connected together, which makes it difficult to discharge effluent from drain separator 6. Further, when drain discharge valve 18 is open, if the difference of the air pressure between the drain outlet of after cooler 5 and the drain outlet of drain separator 6 is small, the viscosity of oil in the drain keeps check valve 19 from overcoming its inherent preset pressure and opening. Consequently, drain effluent may not be discharged from drain separator 6.

Figure 1:
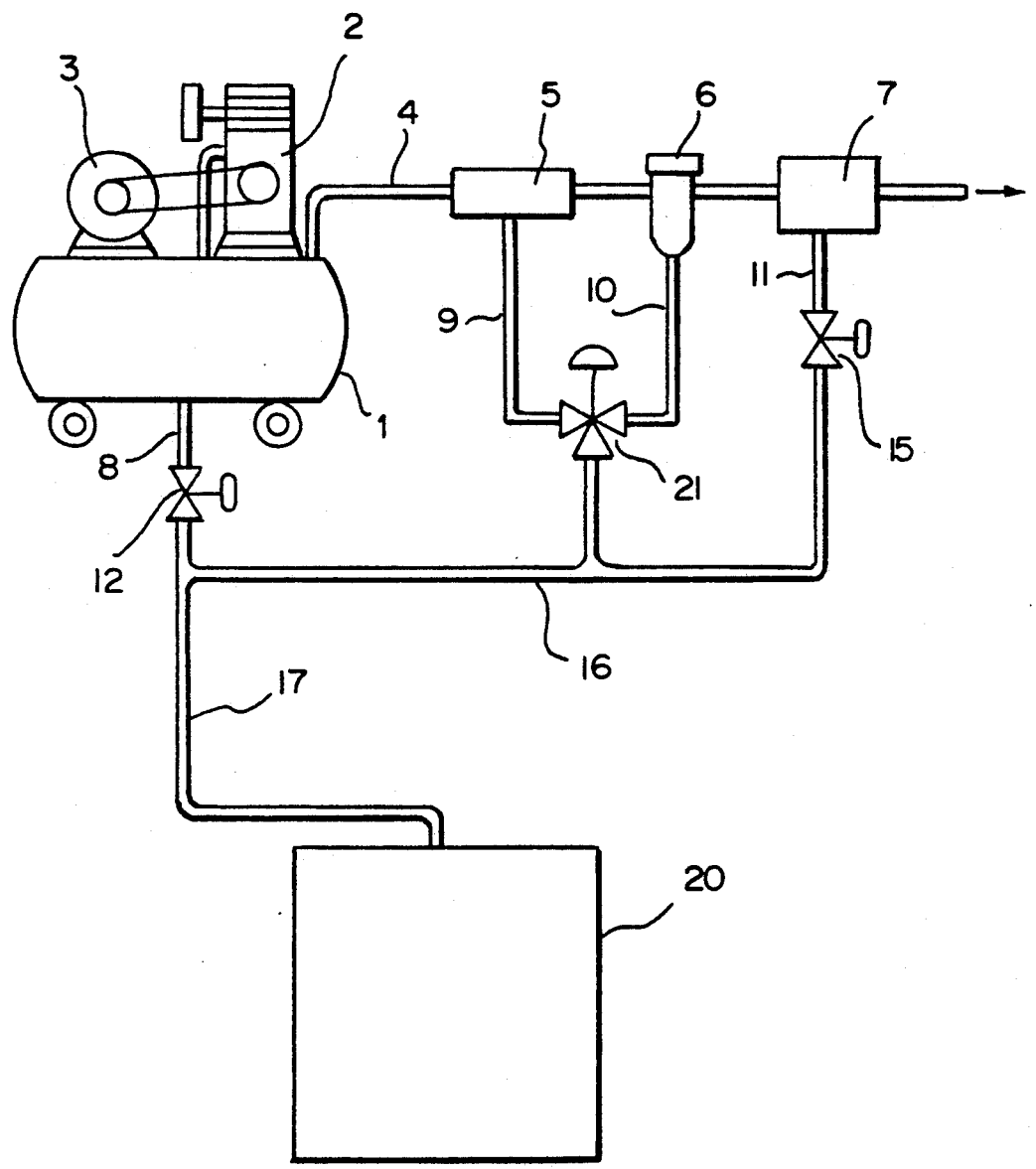
FIG. 1 is a schematic diagram that shows one embodiment of the present invention.

Referring to FIG. 1, the drain outlets of after cooler 5 and drain separator 6 are connected through pipes 9 and 10 respectively to the two drain inlets of a drain discharge valve 21. One outlet of drain discharge valve 21 is connected to drain collection pipe 16. In this manner, effluent from after cooler 5 and air separator 6 is removed through drain discharge valve 21, instead of through two discharge valves (FIG. 12) or the combination of a discharge valve and a check valve (FIG. 13), as is the case in methods of the prior art.

Figure 2:
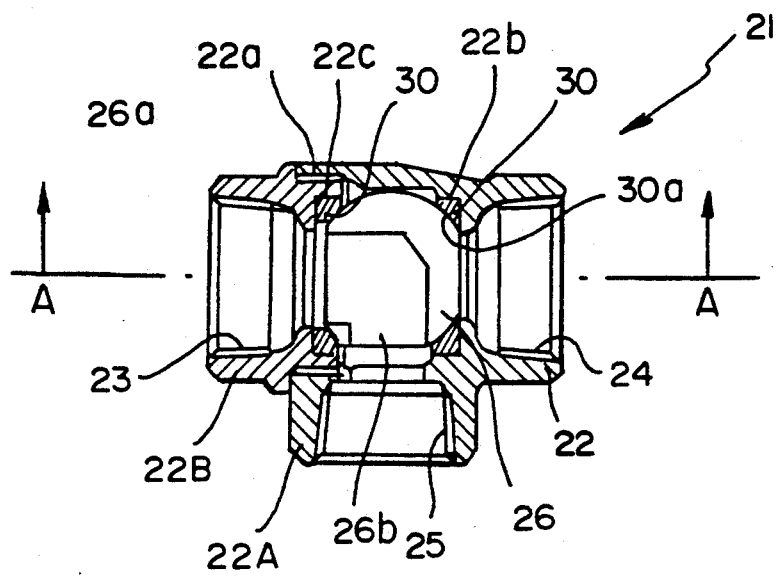
FIG. 2 is a cross sectional view of a drain discharge valve of the embodiment of FIG. 1.

Referring to FIG. 2, discharge valve 21 includes a valve body 22 having a pair of inlets 23 and 24 and an outlet 25. Valve body 22 is, for manufacturing purposes, composed of a first valve body portion 22A fixed with screws (not shown) to a second valve body portion 22B. On the face of each of first and second valve body portions 22A and 22B are provided respective cylindrical concave portions 22b and 22c, into which a valve seat body 30 fits. A valve seat 30a of valve seat body 30 forms a spherical surface, the center of which meets the intersection of the center lines of inlets 23 and 24 and outlet 25. A spherical valve 26, which is water-tight and slidable, is attached to valve seat 30a. Valve 26 has ports 26a and 26b, which are offset at 90 degrees from each other. Ports 26a and 26b are connected together inside valve 26.

EMBODIMENT 1

Figure 3:
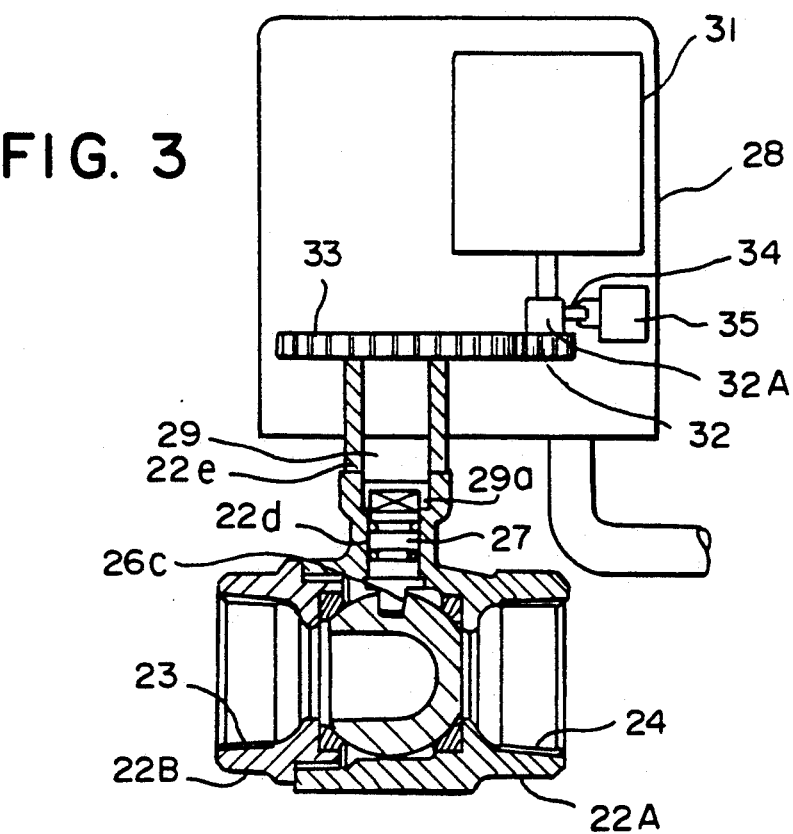
FIG. 3 is a cross section taken along A—A in FIG. 2.

Referring to FIG. 3, first valve body portion 22A includes an opening 22d, disposed orthogonally to the center lines of inlets 23 and 24 and outlet 25 and passing through the point where the center lines of inlets 23 and 24 and outlet 25 meet. A valve drive shaft 27 forms a rotatable, watertight fit in opening 22d. Both ends of valve drive shaft 27 are double threaded. One end fits into a square cavity 26c of valve 26, while the other end fits into a slit 29a disposed at the end of an output shaft 29 of a dividing drive device 28.

Dividing drive device 28 causes output shaft 29 to rotate 90 degrees. Within dividing drive device 28, a small gear 32 fixed to an end of a motor shaft 32A of a dividing motor 31 engages a large gear 33 fixed on output shaft 29. Output shaft 29 fits rotationally into an opening 22e, which is directly outside of opening 22d of first valve body 22A. The gear ratio of small gear 32 to large gear 33 is 1:4. A pin 34 is disposed on motor shaft 32A of dividing motor 31 activate a micro switch 35 with each revolution of dividing motor 31. Dividing motor 31 and micro switch 35 are fixed on the flange (not shown) of dividing drive device 28.

Figure 4:
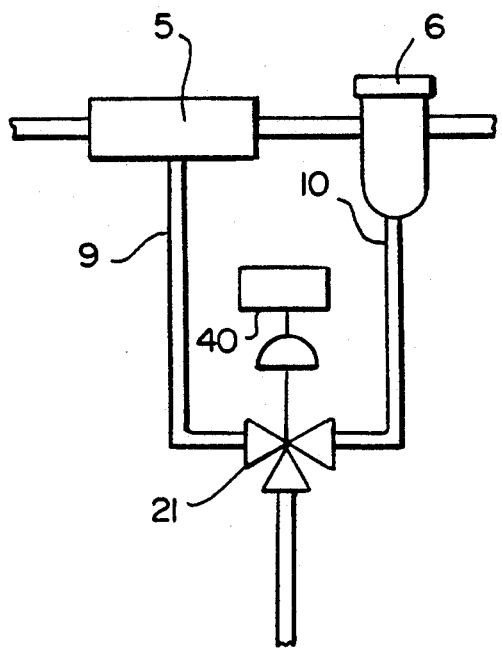
FIG. 4 is a block diagram of the main part of the present invention shown in FIG. 1.

Referring to FIG. 4, the enlargement shows the relations among after cooler 5, drain separator 6, drain pipes 9 and 10, and drain discharge valve 21. Operation of drain discharge valve 21 depends on the setting of a timer 40.

Figure 5A:
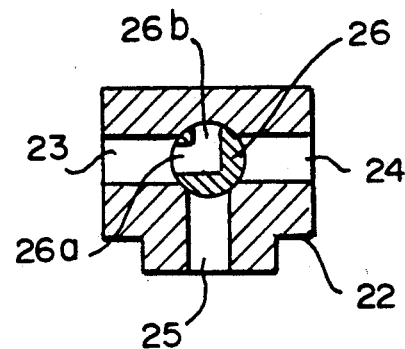
FIGS. 5A through 5D are cross sections showing the operation of the drain discharge valve of the present invention.

Referring to FIGS. 5A-5D, drain discharge valve 21 operates as follows. FIG. 5A shows port 26a of valve 26 connected to inlet 23 while port 26b is blocked by valve body 22. Drain pipe 9 from after cooler 5 runs directly to inlet 23. Drain pipe 10 from drain separator 6 runs directly to inlet 24. With port 26b blocked, effluent is not discharged from after cooler 5 or drain separator 6.

At a preset time controlled by timer 40 (shown in FIG. 4), dividing motor 31 of FIG. 3 responds to a control device (not shown) by turning a single full rotation clockwise, when it is stopped by micro switch 35. Due to the 1:4 gearing, one revolution of small gear 32 fixed to motor shaft 32A turns large gear 33 counterclockwise 90 degrees. Consequently, output shaft 29, valve drive shaft 27, and valve 26 turn 90 degrees in the same direction to the position shown in FIG. 5B.

Figure 5B:
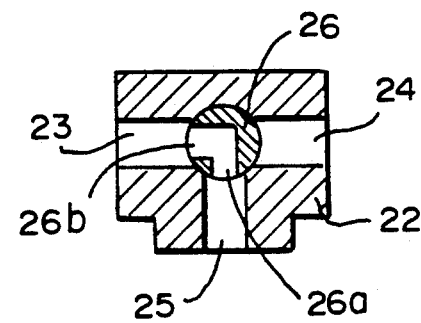

As shown in FIG. 5B, inlet 23 and outlet 25 are connected to port 26b and port 26a, respectively, thus forming a path for effluent to flow from the drain outlet of after cooler 5 through inlet 23, port 26b, port 26a, and outlet 25 for discharge. After a preset interval, timer 40 again activates dividing drive device 28, thereby rotating valve 26 counterclockwise an additional 90 degrees, from the position shown in FIG. 5B to the position shown in FIG. 5C.

Figure 5C:
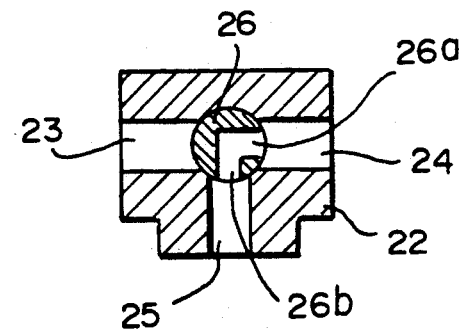

As shown in FIG. 5C, in this condition inlet 24 and outlet 25 are connected respectively to port 26a and 26b. The effluent from drain separator 6 flows through inlet 24, port 26a, port 26b, and then outlet 25 for discharge. After a further preset interval, timer 40 activates dividing drive device 28, thereby rotating valve 26 counterclockwise 90 degrees from the position shown in FIG. 5C to the position shown in FIG. 5D.

Figure 5D:
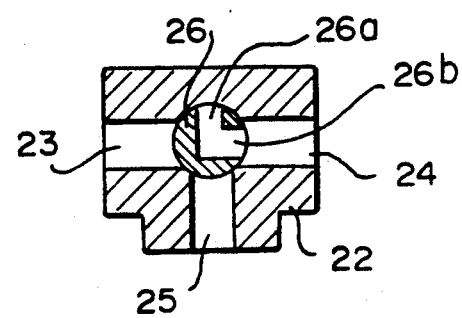

As shown in FIG. 5D, inlet 24 connected to port 26b, and port 26a are blocked by valve body 22, so that effluent is not discharged from after cooler 5 or drain separator 6. When timer 40 is again activated, valve 26 rotates counterclockwise 90 degrees from the position shown in FIG. 5D to its original position shown in FIG. 5A.

In this embodiment, drain discharge valve 21 with 3 ports and 4 positions, whose preferred embodiment is an electric ball valve, makes it possible to drain effluent from after cooler 5 and drain separator 6 by means of a single drain discharge valve. Because drain discharge valve 21 opens and closes ports 26a and 26b by sliding the valve seat and the valve, foreign substances in the drain do not come onto the sliding surface between the valve seat and the valve. Good operation without clogging is assured by the selective connecting and separating of one outlet and a plurality (two, in this embodiment) of inlets by operation of the valve.

EMBODIMENT 2

Referring to FIG. 6, one of the pair of ports 26a and 26b of valve 26, port 26b as shown, is always connected to outlet 25. The other member of the pair, port 26a, selectively takes shuttered positions by either connecting to inlets 23 and 24 or being blocked by valve body 22. Valve drive shaft 27 is disposed on the extension of the center line of outlet 25.

Referring to FIGS. 7A-7D, as in the previous embodiment, inlet 23 connects to the drain outlet of after cooler 5. Inlet 24 connects to the drain outlet of drain separator 6. Outlet 25 connects to collection pipe 16.

Figure 7A:
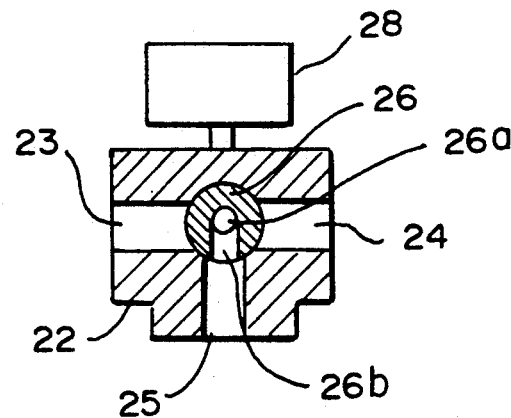
FIGS. 7A through 7D are vertical sectional views showing the operation of the embodiment of FIG. 6.
Figure 7B:
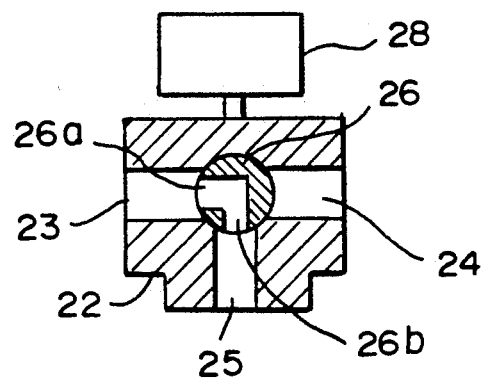

Referring to FIG. 7A, port 26a directs the flow orthogonal to and out from the plane of the surface of the figure and is blocked by valve body 22. With such an arrangement, inlets 23 and 24 are shuttered off from outlet 25. At a preset time, timer 40 is activated, causing (viewing the valve from above) valve 26 to rotate 90 degrees counterclockwise. Consequently, port 26a connects to inlet 23, as shown in FIG. 7B, thereby connecting inlet 23 and outlet 25 together. Effluent is discharged from after cooler 5.

Figure 7C:
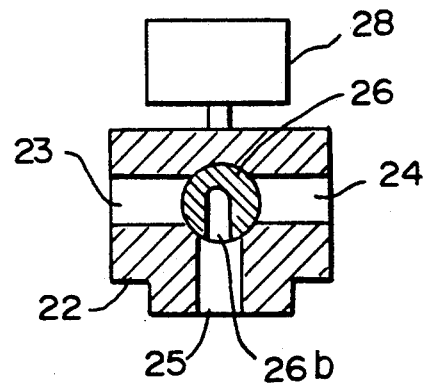
Figure 7D:
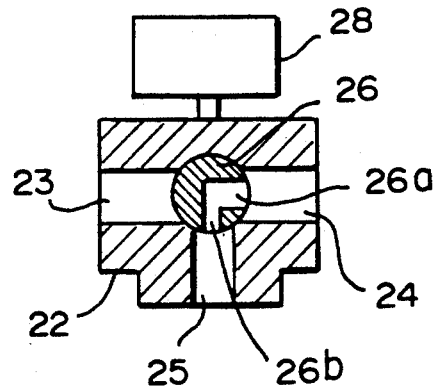

Again, dividing drive device 28 rotates valve 26 90 degrees in the same direction. FIG. 7C shows that port 26b directs the flow orthogonally, with and into the plane of the figure, and port 26a is blocked by valve body 22. Accordingly, inlets 23 and 24 and outlet 25 are shuttered off. When dividing drive device 28 rotates valve 26 again 90 degrees in the same direction, port 26a connects to inlet 24, as shown in FIG. 7D, and inlet 24 and outlet 25 connect together. Consequently, effluent is discharged from drain separator 6. Finally, dividing drive device 28 rotates valve 26 again 90 degrees in the same direction and returns valve 26 to the position shown in FIG. 7A.

In all of the above embodiments, the time the valve is open to discharge the effluent (e.g., FIGS. 5B, 5D, 7B, 7D) is short compared to the time the valve is closed to drainage (e.g., FIGS. 5A, 5C, 7A, 7C). While the valve is closed to drainage, effluent is stored at the sides of inlets 23 and 24 of drain discharge valve 21.

In addition to the actuation of drain discharge valve by a timer, other means of actuation may be employed. For example, in a system that is operated intermittently, drain discharge device may remain off until the occurrence of a certain event such as, for example, a motor shutdown, or the air pressure first reaching a predetermined value. In such a system, dividing motor 31 may be driven continuously for the number of full rotations required to complete a drainage cycle (four rotations in the foregoing embodiment).

EMBODIMENT 3

Referring to FIG. 8, a compressed air pipe 4 runs through after cooler 5, drain separator 6, air drier 7, and mist separator 44. The drain outlets of devices 5, 6, 7, and 44 connect to inlets of a drain discharge valve 45, and the outlet of drain discharge valve 45 connects to drain pipe 16.

Figure 10:
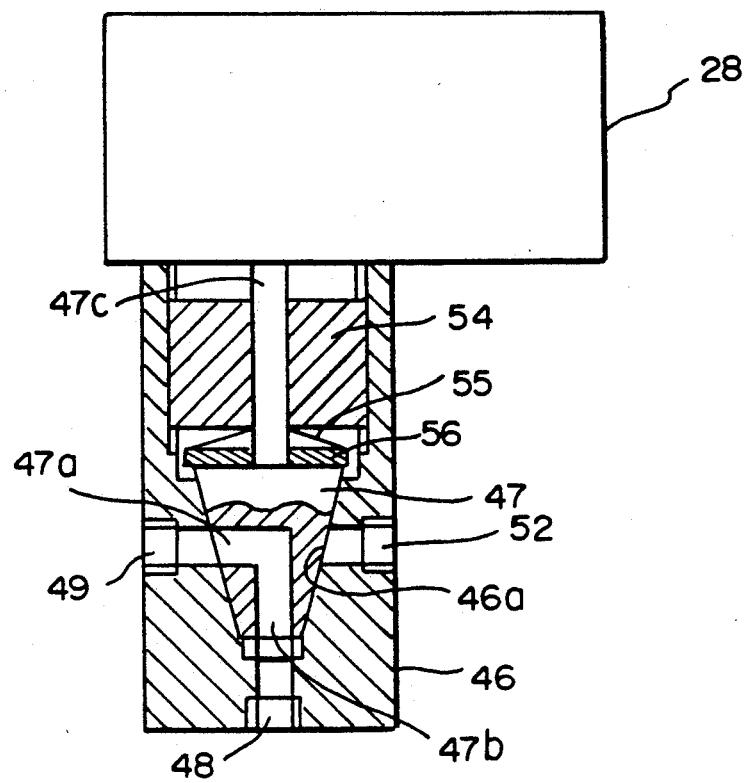
FIG. 10 is a vertical sectional view of the drain discharge valve shown in FIG. 9.

Referring to FIGS. 9 and 10, a conical valve seat 46a provided in a valve body 46 makes a watertight fitting with, and is rotationally slidable about, the vertical axis of a conical valve 47. Inlets 49, 51, 52, and 53 are directed radially in valve body 46. The center to which this radial flow is directed is a port 47b, which extends along the horizontal axis orthogonally with and out from the plane of the figure, connecting to outlet 48. A port 47a selectively connects to each inlet in turn. Ports 47a and 47b are connected together inside conical valve 47. A drive support 54, which is screwed into valve body 46, presses a plate spring 55 and valve 47 through a thrust collar 56, making a watertight fit between conical valve 47 and valve body 46. An output shaft 47c connected to conical valve 47 penetrates the center of drive support 54 and is connected to the output part of dividing drive device 28. In this embodiment, dividing drive device 28 divides the rotation of output shaft 47c into 45 degree intervals.

Operation starts from a position where port 47a is blocked by valve body 46. At a preset time, the timer (not shown) activates divider drive device 28, which rotates conical valve 47 45 degrees. This rotation aligns the drain discharge pipe from after cooler 5 with inlet 49, enabling effluent flow into port 47a, through port 47b, and out from outlet 48 (position=start+45°).

With another 45° rotation in the same direction, port 47a is again blocked by valve body 46, causing the effluent discharge to stop (position=start+90°). When conical valve 47 is again rotated 45 degrees, inlet 49 is actuated, enabling effluent discharge from drain separator 6 (position=start+135°). Another 45 degree rotation causes effluent discharge from inlet 51 to stop (position=start+180°). With another 45 degree rotation of conical valve 47, inlet 52 is actuated, enabling effluent discharge from air drier 7 (position=start+225°). Another 45 degree rotation causes effluent discharge from inlet 52 to stop (position=start+270°). With another 45 degree rotation of conical valve 47, inlet 53 is actuated, enabling effluent discharge from mist separator 44 (position=start+315°). Another 45 degree rotation causes drain discharge from inlet 53 to stop (position=start).

The above 45-degree increments can be accomplished by changing the gear ratio of small gear 32 to large gear 33 to 1:8.

This embodiment permits discharge of effluent from four (4) devices with only one drain discharge valve. It is even possible to fabricate a valve with five (5) or more inlets by widening the diameter of the valve.

EMBODIMENT 4

The embodiment of FIG. 8 can be extended to the case where air compressor 2 is positioned ahead of after cooler 5, air compressor 2 is large, and air tank 1 is disposed between drain separator 6 and air drier 7. Though FIGS. 9 and 10 and the accompanying text disclose a rotating valve in that embodiment, drain discharge valve 21 can be a spool that moves in straight lines, as shown in FIG. 11.

Figure 11:
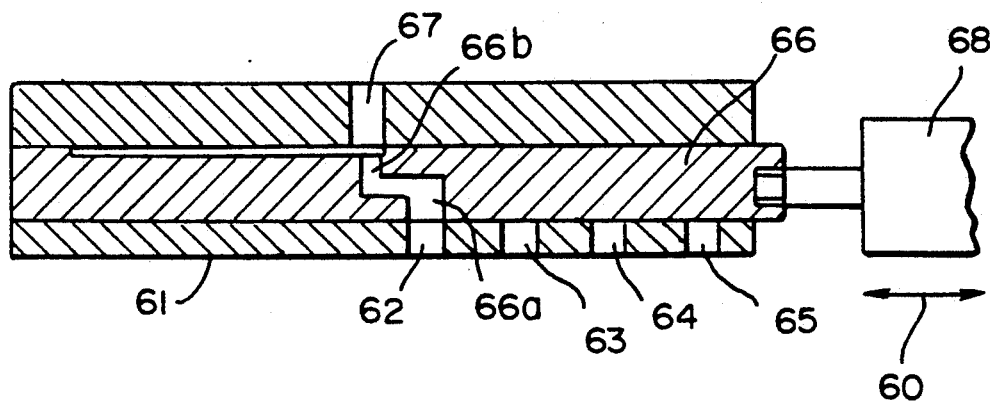
FIG. 11 is a vertical sectional view of the drain discharge valve in another embodiment of the present invention.

Referring to FIG. 11, a valve body 61 has a plurality of inlets 62-65. A port 66a of a spool 66 can be selectively connected to one of the inlets 62-65. A port 66b can always connect an outlet 67 of valve body 61 to spool 66 by straight movement of a dividing drive device 68. Dividing drive device 68 moves back and forth in the direction shown by an arrow 60, thereby providing for the connecting of each inlet 62-65 with the drain outlet of each device that discharges effluent.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for draining effluent comprising:
    a valve having an outlet and a plurality of inlets;
    means for connecting at least two of said plurality of inlets to respective drain outlets of at least two source devices that discharge effluent;
    means for directing said effluent through said valve;
    said means for directing including means for sequentially connecting said outlet to each of said plurality of inlets and means for sealing the remainder of said plurality of inlets for allowing only one of said plurality of inlets to direct said fluid into said outlet at a particular time;
    said means for directing further including:
    an electric ball valve;
    means for driving said electric ball valve to a plurality of positions about its center; and
    at least one port in said electric ball valve being movable between a plurality of positions by rotation of said electric ball valve about said center.

2. A drain discharge device as in claim 1 wherein said means for driving includes a motor responsive and a timer effective for intermittently driving said electric ball valve.

3. A drain discharge device according to claim 1, further comprising:
    at least one port through said electric ball valve;
    means for driving said electric ball valve to at least first and second angular positions;
    said first and second angular positions having an angle therebetween;
    said means for driving further including a first gear and a second gear in mesh with said first gear;
    means for rotating said first gear through a full rotation;
    a gear ratio of said first and second gear effective for rotating said second gear through said angle when said first gear rotates said full rotation; and
    means for connecting rotation of said second gear to said electric ball valve, whereby said electric ball valve is rotated through said angle.

4. A drain discharge device as in claim 1 wherein said means for driving drives said valve in rotation.

5. A device for passing a fluid from a plurality of source devices into a collection area comprising:
    each of said plurality of source devices having a drain outlet;
    a valve having an outlet and a plurality of inlets;
    means for connecting at least two of said plurality of inlets to respective drain outlets of said plurality of source devices;
    means for directing said fluid through said valve;
    said means for directing including an electric ball valve and means for driving said electric ball valve to a plurality of positions about its center;
    said electric ball valve including means for sequentially connecting said outlet to each of said plurality of inlets and means for sealing the remainder of said plurality of inlets for allowing only one of said plurality of inlets to pass said fluid or gas into said outlet at a particular time; and
    said electric ball valve having at least one port movable between a plurality of positions by rotation of said electric ball valve about said center.

6. An effluent drain system for draining effluent from a plurality of devices receiving compressed air from an air compressor, comprising:

said plurality of devices including at least first and second devices connected to receive said compressed air in series;

said first device having a first air pressure drop;

said second device having a second air pressure drop, whereby an air pressure at an outlet of said second device is equal to a supply air pressure at an inlet of said first device minus said first air pressure drop and minus said second air pressure drop;

a first effluent outlet from said first device;

said first effluent outlet having said supply air pressure minus said first pressure drop;

a second effluent outlet from said second device;

said second effluent outlet having said supply air pressure minus said first pressure drop and minus said second air pressure drop;

a drain discharge valve;

said drain discharge valve including at least first and second inlets;

means for connecting said first effluent outlet to said first inlet;

means for connecting said second effluent outlet to said second inlet;

a drain outlet from said drain discharge valve;

said drain discharge valve including means for sequentially connecting said first inlet to said drain outlet, and said second inlet to said drain outlet, and for sealing the other thereof, whereby a difference in pressure at said first and second inlets remains sealed from each other; and a motor driving said means for sequentially connecting, whereby said drain discharge valve continuously sequentially connects said first and second inlets to said drain outlet.

* * * * *